Figure 1:
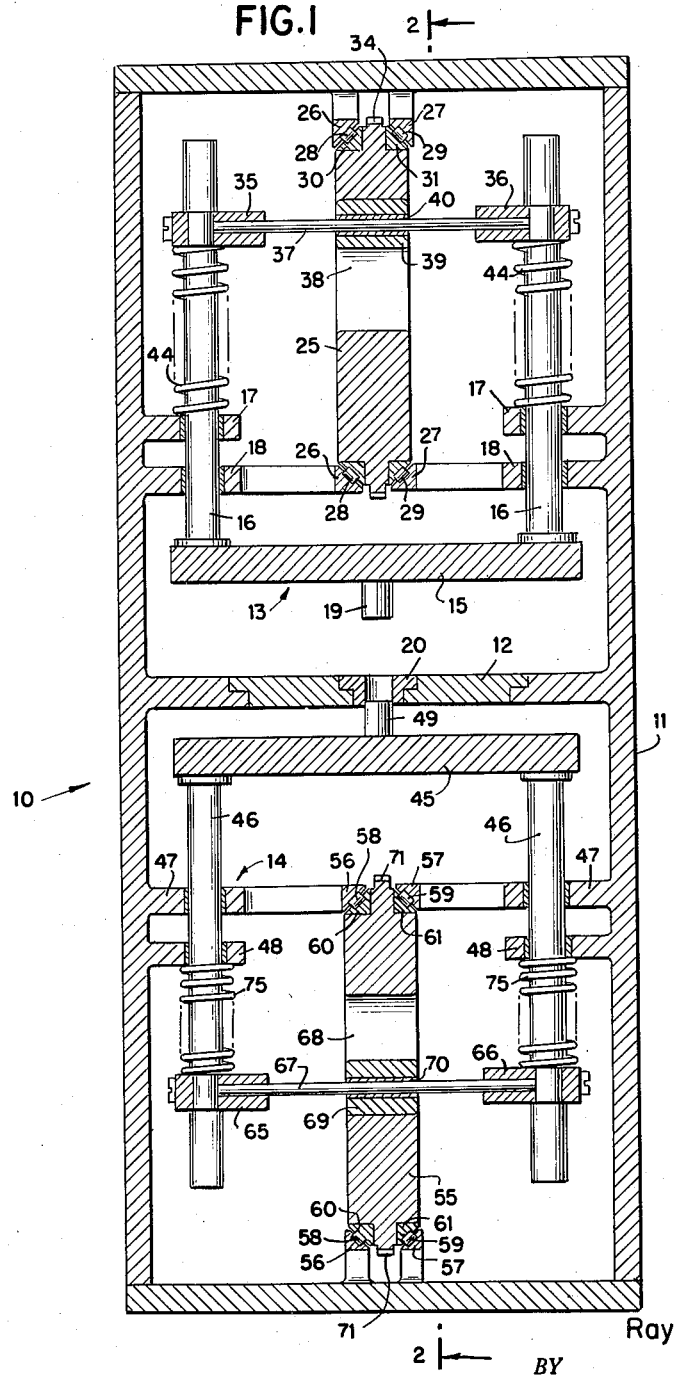

Feb. 7, 1961 R. G. FRANK 2,970,485
DRIVING MECHANISM FOR RECIPROCATING PRESS MEMBERS AND THE LIKE
Filed Feb. 7, 1957 3 Sheets-Sheet 1

INVENTOR.
Raymond G. Frank
BY
Adams, Forward & McLean
ATTORNEYS

Feb. 7, 1961 R. G. FRANK 2,970,485
DRIVING MECHANISM FOR RECIPROCATING PRESS MEMBERS AND THE LIKE
Filed Feb. 7, 1957 3 Sheets-Sheet 2

INVENTOR.
Raymond G. Frank
BY
Adams, Forward & McLean
ATTORNEYS

Feb. 7, 1961    R. G. FRANK    2,970,485
DRIVING MECHANISM FOR RECIPROCATING PRESS MEMBERS AND THE LIKE
Filed Feb. 7, 1957    3 Sheets-Sheet 3

INVENTOR.
Raymond G. Frank
BY
Adams, Forward & McLean
ATTORNEYS

United States Patent Office 2,970,485
Patented Feb. 7, 1961

2,970,485
DRIVING MECHANISM FOR RECIPROCATING PRESS MEMBERS AND THE LIKE

Raymond G. Frank, Ambler, Pa., assignor to F. J. Stokes Corporation, Philadelphia, Pa., a corporation of Pennsylvania Filed Feb. 7, 1957, Ser. No. 638,760
2 Claims. (Cl. 74—55)

My invention relates to mechanical movements and more particularly provides a driving mechanism for imparting reciprocating movement to a driven member. The driving mechanism of my invention has particular utility in the operation of reciprocating press members and the like.

In tablet presses and many similar devices it is frequently necessary to apply relatively large forces on a moving member which must be reciprocated a short distance with a high degree of precision. Thus in a tablet press a pair of punches having confronting faces are reciprocated to oppose each other in a die to compress loose material into a solid tabletted form. Heretofore, punch movement has been accomplished in several ways, for example, the press member carrying the punch has been driven by a lever in turn operated by a rotated cam having the desired rise and fall characteristics to carry the punch through its sequence of positions during the tabletting operation. Unfortunately, wear on the cam limits its useful life, and, moreover, when different positions or sequences of positions are desired the cam must be replaced by another cam having different configuration. Such an arrangement is, moreover, subject to severe deformation making control of tablet size and close tolerances a difficult operation.

It is a principal object of my invention to provide a driven member, such as a press member of a tablet press, in which deformation and wear can have no substantial effect and in which the driven member can be controlled to any desired position by the use of a servo mechanism or the like wherein the desired positions of the driven member can be changed at will, for example, by control of reference signals transmitted to the servo mechanism.

These and other objects of my invention are generally achieved utilizing an internal, oscillating, cam for reciprocating the driven member such that the angular position to which the cam is oscillated to reciprocate the driven member can be varied where necessary to take up wear of the cam and follower, to account for deformation of the driven member, and to permit a change in set position of the driven member.

In a more specific aspect the internal cam has an involute profile of which the circle of generation is concentric with the axis about which the cam is oscillated, and the cam follower carried by the driven member moves along a tangent to such circle of generation. In this manner lateral thrust on the cam follower is minimized since the surface of the cam profile contacting the cam follower is always normal to the direction of reciprocation of the cam follower.

Figure 2:
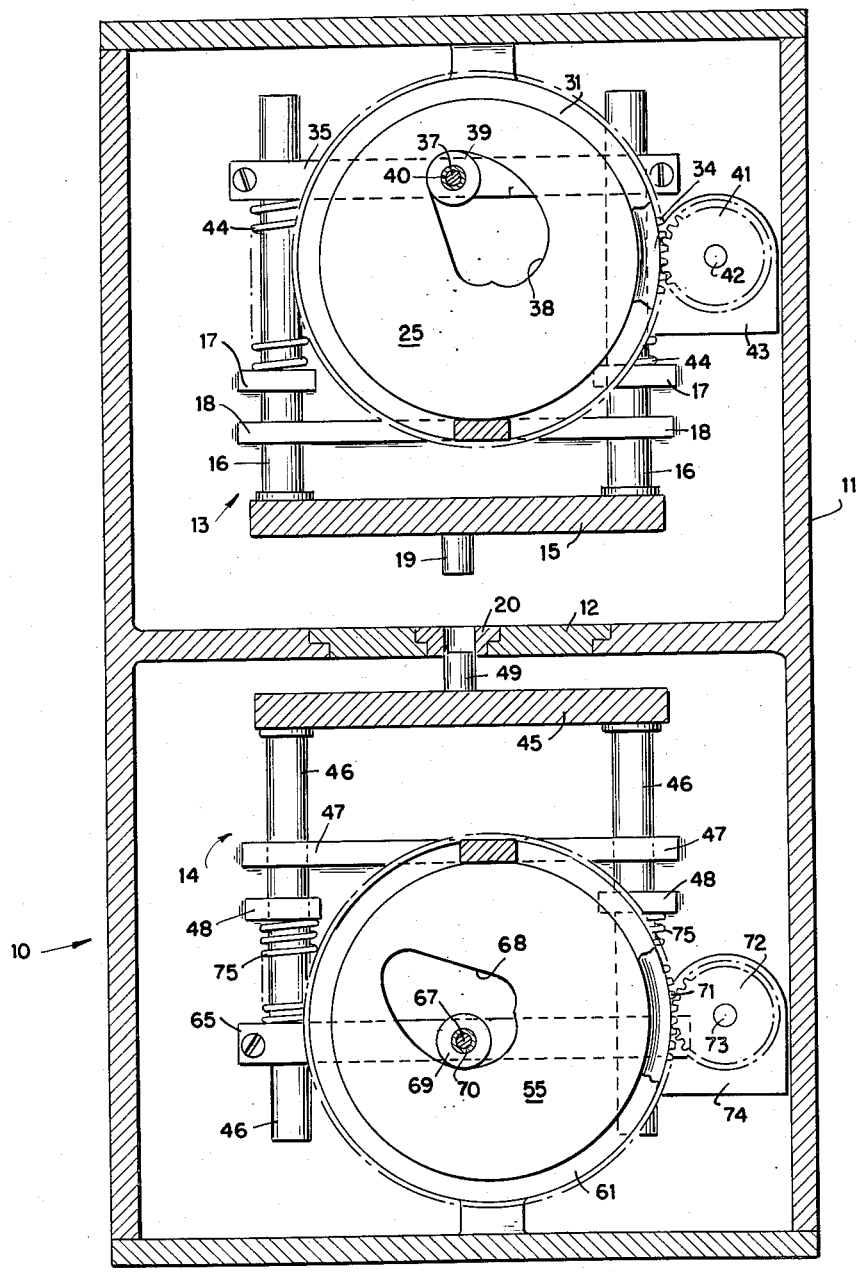
Figure 3:
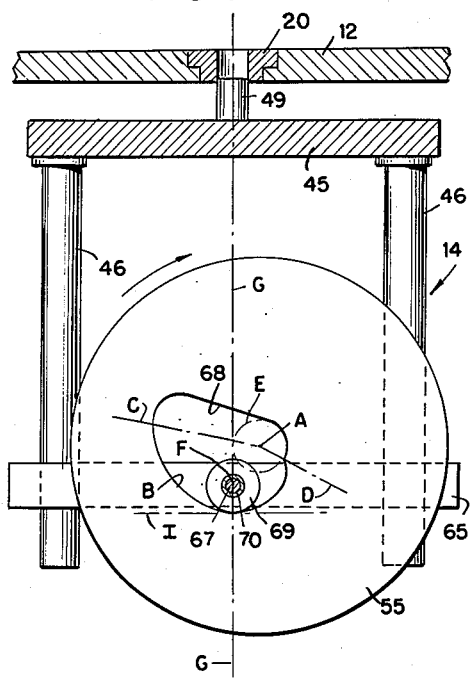
Figure 4:
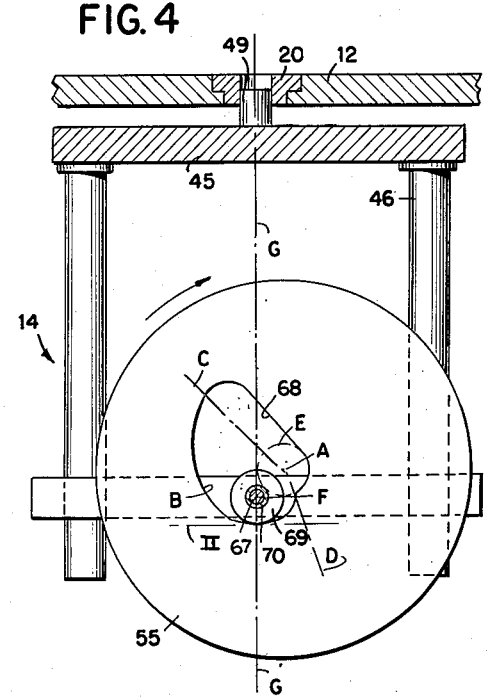
Figure 5:
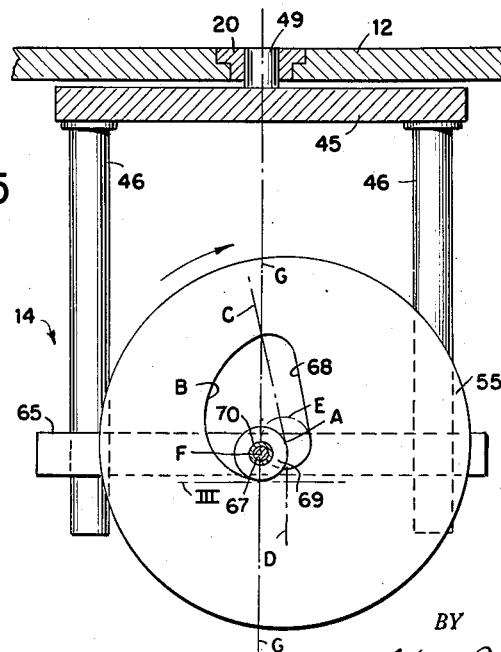

For a more complete understanding of the principles of my invention, reference is made to the drawings which illustrate a tablet press including press members driven by the mechanism of my invention and in which:

Figure 1 is a vertical, sectional view of the press;
Figure 2 is another vertical, sectional view of the press taken at line 2—2 in Figure 1;
Figure 3 is a fragmentary, somewhat diagrammatic view of a portion of the press shown in Figure 2;
Figure 4 is a view similar to Figure 3 illustrating movement of the parts shown in Figure 3;
Figure 5 is a view similar to Figures 3 and 4 illustrating still further movement of the parts shown in Figure 3.

Referring to the drawings the reference numeral 10 designates a tablet press having a frame 11 supporting a horizontal die table 12 between an upper press member 13 and lower press member 14.

Upper press member 13 includes a platen 15 supported at the lower end of four slide rods 16 which are vertically slidable through upper guides 17 and lower guides 18 formed in frame 11. The underside of platen 15 carries upper punch 19 which is vertically reciprocable downwardly into the vertical bore of a die 20 mounted in die table 12.

Centrally between slide rods 16 a cam 25 is supported within frame 11 for rotation about a horizontal axis by means of a pair of opposing conical bearing races 26 and 27. Races 26 and 27 are supported by frame 11 and respectively hold cylindrical bearings 28 and 29 against opposite peripheral conical edges 30 and 31 of cam 25. A cross plate 35 is secured to one adjacent pair of slide rods 16 above their associated upper guides 17. A similarly disposed cross plate 36 is secured to the other pair of slide rods 16, and a fixed shaft 37 is carried between cross plates 35 and 36.

Cam 25 has a cut-away interior portion defining a space which is offset from the axis of rotation of cam body 25 through which passes a cylindrical cam follower 39 rotatively mounted by means of a brushing 40 on shaft 37. Cam 25 also includes about its periphery a plurality of gear teeth 34 which mesh with a pinion gear 41 carried on the output shaft 42 of an electrical motor 43 mounted in fixed position in frame 11.

Four heavy coil springs 44 are mounted, one on each slide rod 16 between its associated upper guide 17 and cross plate 35 or 36. In this manner, because of compression always placed on springs 44, plates 35 and 36 are urged upwardly to hold cylindrical cam follower 39 in contact with the inside surface 38 of cam 25.

Lower press member 14 similarly includes four vertical slide rods 46 which depend from lower platen 45 and are slidingly received by upper guides 47 and lower guides 48 formed in frame 11. A lower punch 49 is carried on the upper surface of platen 45 for reciprocation upwardly into the bore of die 20 confronting upper punch 19.

Centrally between slide rods 46 a lower cam 55 is mounted for rotation about a horizontal axis within frame 11 by means of a pair of opposing conical bearing races 56 and 57. Races 56 and 57 are supported in frame 11 and respectively hold cylindrical bearings 58 and 59 against opposite peripheral conical edges 60 and 61 of cam 55. Beneath lower guides 48 one pair of adjacent slide rods 46 carry between them a cross plate 65. Similarly the other pair of rods 46 carry a cross plate 66. Cross plates 65 and 66 support between them a fixed shaft 67.

Like cam 25, cam 55 includes an internal open portion which is offset from the axis of rotation of cam 55 and through which passes a cylindrical cam follower 69 rotatively mounted on shaft 67 by means of a bushing 70. Cam 55 is also provided with peripheral gear teeth 71 which mesh with a pinion gear 72 carried on the output shaft 73 of a motor 74 mounted in fixed position in frame 11.

Four heavy coil springs 75 are positioned, one about each rod 46 under compression between the associated lower guide 48 and cross plate 65 or 66 thus holding cylindrical cam follower 69 in contact with internal cam surface 68.

Referring more particularly to Figures 3, 4 and 5 which in diagrammatic form illustrate the movement of lower press member 14, it will be observed that cam 55 rotates about a horizontal axis, indicated by the reference letter A. The portion B of internal cam surface 68 lying between lines C and D and constituting the operating profile of cam 55, is in the form of an involute generated from a circle E lying in a vertical plane and concentric with axis A. It will be further observed that the horizontal axis of rotation F of cylindrical follower 69 lies on a vertical plane G which is tangent to circle of generation E of involute profile B of cam surface 68.

All contact between cam surface 68 and the surface of cylindrical follower 69 is confined in the portion B of cam surface 68. Thus the immediate area of contact of surface B with follower 69, since surface B is an involute generated about a circle having its center on axis A about which involute surface B is rotated, must be normal (horizontal in the illustrated case) to plane G. Oscillation of cam 55, therefore, exerts only vertical thrust on cam follower 69, ignoring the negligible lateral thrust component caused by friction in bearing 70.

Thus, for example, referring specifically to Figure 3 which is typical of the position of press member 14 during filling of die 20 when lower punch 49 is positioned with its upper surface just entering the lower end of the bore in die 20, it will be observed that the line of contact between cam surface 68 and cam follower 69 lies in a horizontal plane I. As lower punch 49 is raised in die 20 to compress material contained in the bore of die 20 against opposing downward movement of upper punch 19, it will be observed that press member 14 is raised by clockwise oscillation of cam 55 in which the tangent contact between surface of follower 69 and cam surface 68 always remains in a horizontal plane denoted by the reference line II in Figure 4. When upper punch 19 is withdrawn in the usual manner from die 20 and the tabletted product ejected by raising lower punch 49 to bring its upper surface flush with the upper surface of die table 12 the upward movement of press member 14 is produced by further clockwise rotation of cam 55 in which the contact between cam surface 68 and the surface of follower 69 still remains in a horizontal plane as denoted by the reference line III in Figure 5.

As pointed out above, the plane of contact of follower 69 and cam surface 68 is always horizontal and consequently, the thrust exerted by cam surface 68 against follower 69 is always vertical thereby minimizing wear of slide rods 46 and guides 47 and 48 of frame 11. Aside from the advantage thereby achieved, the employment of an involute cam profile also provides the advantage of constant torque, and constant velocity output for constant velocity input. It also has an inherent property that as punch 49 moves upward to compress material in die 20, the resisting force increases whereas the radius of curvature of involute B decreases approaching the radius of curvature of follower 69. Bearing stresses between cam and follower are thereby reduced affording greater life of follower and cam.

It will be further evident from its construction, that operation of upper press member 13 is essentially the same as that of lower press member 14 illustrated specifically and requires no further explanation here.

Because of the simplicity of construction of the press members 13 and 14 which is possible in the driving mechanism of my invention, deformation of the press members causing lack of precision control of punches 19 and 49 is minimized. Moreover, it will be evident that punches 19 and 49 can be driven to any desired position utilizing the oscillating cam drive of my invention. Properly positioned stops and micro switches can be located on frame 11 for controlling the operation of motors 43 and 74 in a suitably sequenced control system to drive press members 13 and 14 through any desired sequence of operation. Preferably, however, motors 43 and 74 are controlled by servo mechanisms including position sensitive elements, located on platens 15 and 45, for example, and by employing a sequencing switch for selecting a proper reference signal for each desired position in the sequence of desired operation in press 10. A suitable control servo mechanism is described in copending application of Charles A. Belsterling, Serial Number 638,758, filed of even date herewith, now United States Patent No. 2,885,618.

In either case, whether position control is effected by mechanical contact of portions of the press members with stops and electrical control switches or whether position control is obtained through use of servo-mechanisms responsive to position sensitive devices, such as differential transformers and the like, it will be evident that any desired position of a press member can be obtained uniformly and constantly throughout operation of the device despite wear which might occur on cam surface 68 and follower 69 since selection of position need not be dependent on the angular position of cam 55, but can be based upon the reciprocated position of press member 14.

I claim:
1. In a press including a press member mounted for reciprocating movement, the improvement which includes a cam body mounted for oscillating movement about an axis in a plane perpendicular to the direction of reciprocating movement of said press member, said cam including an internal cam profile, said cam profile including a portion offset from the axis of oscillation of said cam body through a limited sector of said body having the form of an involute generated from a circle having its center on said axis of oscillation, a cam follower mounted on said press member in contact with the involute portion of said cam profile, said cam follower being reciprocable with said press member centered on a fixed plane tangent to said circle of generation, and means for oscillating said cam body about said axis to carry contact of said follower from any one position to any other position along said involute portion of said profile within said sector.

2. A driving mechanism for reciprocating press members and the like which includes a driven member mounted for reciprocating movement, a cam body mounted for oscillating movement about an axis in a plane perpendicular to the direction of reciprocating movement of said driven member, said cam body including an internal cam profile, said cam profile including a portion offset from the axis of oscillation of said cam body through a limited sector of said body having the form of an involute generated from a circle having its center on said axis of oscillation, a cam follower mounted on said driven member in contact with the involute portion of said cam profile, said cam follower being reciprocable with said driven member centered on a fixed plane tangent to said circle of generation, and means for oscillating said cam body about said axis to carry contact of said follower along said involute portion of said profile within said sector.

References Cited in the file of this patent
UNITED STATES PATENTS

| | | |
|---|---|---|
| 543,731 | Hempsted | July 30, 1895 |
| 617,124 | Robinson | Jan. 3, 1899 |
| 2,660,278 | Landwier | Nov. 24, 1953 |
| 2,704,874 | Ebersole | Mar. 29, 1955 |
| 2,905,433 | Till et al. | Sept. 22, 1959 |

FOREIGN PATENTS

| | | |
|---|---|---|
| 299,828 | Italy | Aug. 18, 1932 |
| 564,142 | Great Britain | Sept. 14, 1944 |

OTHER REFERENCES

Publication: Cams, Design, Dynamics and Accuracy, by Harold A. Rothbart, 1956 ed., published by John Wiley & Sons, Inc., New York, Chapter 4, pages 93–130.